United States Patent
Fang et al.

(10) Patent No.: US 9,559,572 B2
(45) Date of Patent: Jan. 31, 2017

(54) METHOD FOR MANUFACTURING PERMANENT-MAGNET MOTOR ROTOR

(75) Inventors: Youtong Fang, Zhejiang (CN); Jien Ma, Zhejiang (CN); Xiaoyan Huang, Zhejiang (CN); Jian Zhang, Zhejiang (CN); Qinfen Lu, Zhejiang (CN); Jiancheng Zhang, Zhejiang (CN); Wei Chen, Zhejiang (CN); Jiabin Liu, Zhejiang (CN)

(73) Assignee: Zhejiang University, Hangzhou (CN)

( * ) Notice: Subject to any disclaimer, the term of this patent is extended or adjusted under 35 U.S.C. 154(b) by 0 days.

(21) Appl. No.: 14/373,616

(22) PCT Filed: Apr. 26, 2012

(86) PCT No.: PCT/CN2012/074769
§ 371 (c)(1),
(2), (4) Date: Jul. 21, 2014

(87) PCT Pub. No.: WO2013/107128
PCT Pub. Date: Jul. 25, 2013

(65) Prior Publication Data
US 2015/0026966 A1  Jan. 29, 2015

(30) Foreign Application Priority Data

Jan. 22, 2012 (CN) .......................... 2012 1 0019996

(51) Int. Cl.
*H02K 15/04* (2006.01)
*H02K 15/03* (2006.01)
*H02K 1/27* (2006.01)

(52) U.S. Cl.
CPC .............. *H02K 15/03* (2013.01); *H02K 1/276* (2013.01); *Y10T 29/49012* (2015.01)

(58) Field of Classification Search
CPC ..... H02K 1/278; H02K 11/0089; H02K 15/03
(Continued)

(56) References Cited

U.S. PATENT DOCUMENTS

| | | | | |
|---|---|---|---|---|
| 4,219,752 A | * | 8/1980 | Katou ....................... | 310/156.19 |
| 4,469,970 A | | 9/1984 | Neumann | |
| 5,237,737 A | * | 8/1993 | Zigler ................ | H01F 41/0253 |
| | | | | 156/297 |

(Continued)

FOREIGN PATENT DOCUMENTS

| | | |
|---|---|---|
| CN | 102005838 A | 4/2011 |
| CN | 102545435 A | 7/2012 |

(Continued)

OTHER PUBLICATIONS

International Search Report issued in PCT/CN2012/074769 mailed on Nov. 22, 2012 (4 pages).

(Continued)

*Primary Examiner* — Minh Trinh
(74) *Attorney, Agent, or Firm* — T. Chyau Liang (57) ABSTRACT

A method for manufacturing a permanent-magnet motor rotor includes manufacturing a rotary shaft, a permanent magnet, a front end cover, a rear end cover, and a magnetic yoke unit, where the magnetic yoke unit contains multiple pole shoe parts and one iron core part, where each pole shoe part and the iron core part are connected therebetween via a connecting strip; manufacturing a rotor spacer; all positioning holes of the magnetic yoke unit correspond to the permanent-magnet through hole of the rotor spacer to form a permanent-magnet passage; inserting the permanent magnet into the permanent-magnet passage; inserting tightening bolts; cutting off the mid-section of each connecting strip, overlapping the pole shoe parts to form a rotor pole shoe, overlapping the iron core parts to form a rotor iron core; and arranging respectively the front end cover and the rear end cover on a front end and a rear end.

20 Claims, 9 Drawing Sheets

(58) Field of Classification Search
USPC .............. 29/506–598, 732, 736; 310/42, 310/156.18–156.19
See application file for complete search history.

(56) References Cited

U.S. PATENT DOCUMENTS

| | | | | |
|---|---|---|---|---|
| 5,345,669 | A | * | 9/1994 | Zigler ................. H01F 41/0253 29/598 |
| 5,563,463 | A | * | 10/1996 | Stark ........................ 310/156.28 |
| 5,881,448 | A | * | 3/1999 | Molnar ........................... 29/598 |
| 2011/0127859 | A1 | | 6/2011 | Amrhein et al. |
| 2012/0014823 | A1 | * | 1/2012 | Riedl et al. .............. 417/423.12 |

FOREIGN PATENT DOCUMENTS

| | | |
|---|---|---|
| JP | 2001-157396 A | 6/2001 |
| JP | 2002-191143 A | 7/2002 |
| JP | 2004229442 A | 8/2004 |
| JP | 2008-228395 A | 9/2008 |
| WO | 2013107127 A1 | 7/2013 |

OTHER PUBLICATIONS

Written Opinion of the International Searching Authority issued in PCT/CN2012/074769 mailed on Nov. 22, 2012 (5 pages).
PCT International Preliminary Report on Patentability and Written Opinion issued Jul. 22, 2014, by the International Bureau of WIPO in corresponding International Application No. PCT/CN2012/074769, with an English translation (13 pages).
Extended European Search Report issued Mar. 11, 2016 in corresponding European application No. 12866347.3 (8 pages).

\* cited by examiner

METHOD FOR MANUFACTURING PERMANENT-MAGNET MOTOR ROTOR

CROSS REFERENCE TO RELATED APPLICATIONS

This is a national stage application of PCT/CN2012/074769, filed on Apr. 26, 2012, which claims priority of Chinese Patent Application No. CN 201210019996.1, filed on Jan. 22, 2012. This application claims the benefits and priority of these prior applications and incorporates the disclosures of these prior applications by reference in their entirety.

BACKGROUND OF THE INVENTION (1) Field of the Invention

The invention relates to a method for manufacturing a permanent-magnet motor rotor.

(2) Field of the Invention

A motor is an electromagnetic device taking magnetic field as media to carry out mutual conversion between mechanical energy and electrical energy. In order to establish an air-gap magnetic field inside of the motor needed by electromechanical energy conversion, two methods are provided. As to one method, a motor winding is energized to generate a magnetic field, such as a conventional DC motor, the motor and so on. This electrically excited motor not only needs a special winding and a corresponding device but also needs to be continuously provided with energy to maintain its current flow. As to the other method, the magnetic field is generated by a permanent magnet. Due to the inherent characteristics of a permanent-magnet material, after it is pre-magnetized (magnetization), it does not need external energy to establish the magnetic field around its surrounding space; that is, it is the so-called permanent magnet motor.

Compared with the conventional excited motor, the permanent magnet motor has the advantages of simple structure, low loss, high power factor, high efficiency, high power density, high starting torque, low temperature, light weight and other obvious characteristics. With the continuous improvement and perfection of the magnetic properties in rare-earth permanent-magnet materials (especially NdFeB) and gradually reduced price, the permanent-magnet motor research and development gradually becomes mature, thus facilitating the permanent magnet motor to be more and more widely used in defense, industrial and agricultural production, daily life and so on.

The permanent-magnet motor is the motor which depends on the permanent magnet on a rotor to generate the magnet field. Its stator structure is basically identical to that of a common synchronous/asynchronous motor. That is, it consists of a stator iron core constituted by stacked silicon steel sheets and a stator coil embedded in an iron-core slot of the stator. It is energized by three-phase alternating current to generate a rotating magnetic field in the stator coil. The permanent-magnet motor rotor mainly consists of a rotor iron core and the permanent magnet, which is the main difference between the permanent-magnet motor and other type of the motor. A rotor magnetic circuit structure is the key technology of the permanent magnet motor. If a magnetic path structure adopted by the rotor is different, the operating performance, the control strategy, the manufacturing process and the use occasion of the motor are also different.

According to different installation locations of the permanent magnet in the permanent magnet motor rotor, the rotor magnetic path of the permanent-magnet motor may generally be divided into three types including a surface type, a built-in type and a claw-pole type. The surface-type rotor magnetic path has the advantages of simple structure and low manufacturing cost. However, as the surface of the rotor may not be mounted with a starting winding, this type permanent-magnet motor does not have asynchronous starting capability. Furthermore, the rotor has worse mechanical strength, and the permanent magnet is easily broken at high rotation speed. The permanent magnet of the built-in type permanent-magnet motor rotor is positioned inside the rotor. According to the relationship between the magnetization direction of the permanent magnet and the rotation direction of the rotor, the magnetic path structure of the built-in type rotor can also be divided into three types including a radial type, a tangential type and a mixed type. Compared with the surface type rotor, the built-in permanent-magnet motor rotor may protect the permanent magnet with the lower mechanical properties. According to performance requirements of the permanent-magnet motor, the size of the permanent magnet may be tremendously increased. Therefore, the structure of the permanent-magnet motor rotor is currently widely used.

At present, the conventional permanent-magnet motor rotor generally adopts a rotor guide strip to fasten the rotor. However, there are still obvious problems of low mechanical strength, poor reliability, severe eddy current loss of the rotor surface, obvious magnetic flux leakage, etc. These hinder the development of the permanent-magnet motor with high power, high speed and large rotary diameter, and further more limit the application of the permanent-magnet motor on high-speed trains as a traction motor.

China patent application No. 201010513307.3 discloses a big-power permanent-magnet motor rotor and a method for mounting the rotor. Adopting a permanent-magnet embedded structure, the rotor consists of at least two rotor units along the axial direction. A magnet-separation groove along the rotor in the axial direction is opened and provided on an iron core between two adjacent permanent magnets of each rotor unit. A spacer made of a non-magnetic material is provided between the adjacent rotor units. An end plate is provided at two ends of the rotor unit. At least two rotor units are fixed through axially positioned tightening bolt.

The permanent-magnet rotor has the following disadvantages: 1. The centrifugal force stressed by a rotor pole shoe is born jointly by an end plate, the spacer and a positioning tightening bolt. That is, the positioning tightening bolt fixing the rotor unit needs to bear bending moment. When the rotor rotates at high speed, the centrifugal force is so large that the positioning tightening bolt is easily to be bended by the centrifugal force. That is, the rotor does not apply to the motor with high speed rotation. 2. Although the magnet-separation groove is opened and provided at the iron core, the iron core, between the adjacent permanent magnet, still has a connection part. The magnetic field of the permanent magnet of adjacent poles, through the direct communication of the iron core between the permanent magnets, causes magnetic flux leakage. That is, the structure cannot avoid magnetic flux leakage and has serious magnetic flux leakage. 3. The spacer is provided between two adjacent rotor units. The thickness of the spacer occupies the effective length of the rotor in the axial direction. When the number of the rotor units of the adopted rotor is increased and the thickness of the rotor spacer is increased, the effective length is dramatically reduced, thus affecting the electromagnetic properties of the rotor.

BRIEF SUMMARY OF THE INVENTION

In order to overcome the above defects in the prior art, the invention provides a method for manufacturing a permanent-magnet motor rotor, which may manufacture a motor with high mechanical strength and applicable for high-speed rotation.

A method for manufacturing a permanent-magnet motor rotor includes the following steps:

1) manufacturing a rotary shaft, a permanent magnet, a front end cover and a rear end cover; manufacturing a magnetic yoke unit, wherein the magnetic yoke unit includes multiple pole shoe parts and one iron core part, wherein the pole shoe parts are arranged around the iron core part, wherein the pole shoe parts are independent with each other and uniformly distributed, wherein each pole shoe part and the iron core part are connected therebetween via a connecting strip, wherein the pole shoe part, the connecting strip, and the iron core part circle and form a positioning hole positioning the permanent magnet axially and circumferentially, wherein the pole shoe part is provided with a pole-shoe bolt through hole allowing for penetration by a pole-shoe tightening bolt, and wherein the iron core part is provided with an iron-core bolt through hole allowing for penetration by an iron-core tightening bolt;

2) manufacturing a rotor spacer with a non-magnetic material, wherein the rotor spacer divides a rotor structure into multiple rotor units in the axially direction, wherein the rotor spacer is provided thereon with a permanent-magnet through hole allowing for penetration by the permanent magnet, and the rotary spacer is provided thereon with the pole-shoe bolt through hole allowing for penetration by the pole-shoe tightening bolt and provided thereon with the iron-core bolt through hole allowing for penetration by the iron-core tightening bolt;

3) sleeving the magnetic yoke unit and the rotor spacer on the rotary shaft, wherein the connection between the rotary shaft and the iron core part of the magnetic yoke unit and the connection between the rotary shaft and the rotor spacer are both key connection, wherein the magnetic yoke unit and the rotor spacer are distributed axially and at regular intervals, and wherein the rotor spacer divides the rotor structure into multiple rotor units in the axially direction;

all the positioning holes of the magnetic yoke unit correspond to each other to form a positioning passage; the positioning passage corresponds to the permanent-magnet through hole of the rotor spacer to form a permanent-magnet passage; the pole-shoe bolt through hole of the magnetic yoke unit corresponds to the pole-shoe bolt through hole of the rotor spacer one by one to form a pole-shoe bolt passage allowing for penetration by the pole-shoe tightening bolt; the iron-core bolt through hole of the magnetic yoke unit corresponds to the iron-core bolt through hole of the rotor spacer one by one to form an iron-core bolt passage allowing for penetration by the iron-core tightening bolt;

4) inserting the permanent magnet into the permanent-magnet passage, wherein the permanent magnet is in clearance fit with a permanent-magnet passage;

5) inserting the pole-shoe tightening bolt into each pole-shoe bolt passage, wherein the pole-shoe tightening bolt is in clearance fit with the pole-shoe bolt passage; inserting the iron-core tightening bolt into each iron-core bolt passage, wherein the iron-core tightening bolt is in clearance fit with the iron-core bolt passage, using respectively the two ends of the tightening bolt to connect with nuts to tighten the magnetic yoke unit and the rotor spacer, wherein the connecting strip on the magnetic yoke unit overlap each other at this time;

6) cutting off the mid-section of each connecting strip; overlapping the pole shoe parts to form the rotor pole shoe; and overlapping the iron core part to form a rotor iron core, wherein the rotor pole shoe and the rotor iron core are independent with each other, and 7) arranging respectively the front end segment and the rear end segment of the rotor structure on a front end plate and a rear end plate.

Furthermore, in Step 1): multiple laminations overlap to form the magnetic yoke unit.

Furthermore, in Step 1): the magnetic yoke unit is made of a ferromagnetic material plate with good magnetic property.

Furthermore, in Step 1): a flat key is provided on the rotary shaft; the rotor spacer and the rotor iron core are provided thereon with a rotary-shaft through hole allowing for penetration by the rotary shaft and a key slot matched with the flat key; the flat key is matched with the key slot to realize the circumferential positioning of the rotary shaft, the rotor iron core and the rotor spacer; and a shaft ring is provided on the rotary shaft to realize the circumferential positioning of the rotor iron core and the rotor spacer which are relative to the rotary shaft.

Furthermore, the permanent magnet between the rotor pole shoe and the rotor iron core is a single-block magnet.

Or multiple permanent magnets between the rotor pole shoe and the rotor iron core are jointed along the rotor axially to form a permanent magnet group; the permanent-magnet through hole on the rotor spacer corresponds to the permanent magnet one by one; and a placing strip is provided between the adjacent permanent-magnet through holes.

Furthermore, in Step 2): there is a smooth transition curve at the corner of the permanent-magnet through hole on the rotor spacer, thus lowering the stress concentration of the rotor spacer caused by the extrusion of the permanent magnet during rotation.

Furthermore, in Step 2): with finite element analysis, the rotor spacer is opened and provided thereon with a lightening hole reducing the weight of the rotor spacer and lowering the stress concentration; multiple lightening holes are uniformly distributed around each permanent-magnet through hole; multiple lightening holes around the same permanent magnet form one lightening-hole group; the lightening-hole groups are symmetrically distributed therebetween; and the lightening hole is a hole circled by a smooth curve.

The lightening hole is a circular hole, a kidney-shaped hole, or a polygonal hole with arc transition at its corner; and the lightening hole is mainly concentrated at the corner of the permanent-body through hole.

Furthermore, in Step 4): the upper end surface of the permanent magnet and the lower end surface of the rotor pole shoe are fitted; there is a metal glue between the permanent magnet and the rotor pole shoe; the lower surface of the permanent magnet and the rotor iron core are fitted; and there is the metal glue between the permanent magnet and the rotor iron core.

Furthermore, in Step 5): a lock washer is placed between the nut of an iron-core tightening bolt and the rotor iron core to prevent the nut of the iron-core tightening bolt from becoming loosed; or the thread fitting between the iron-core tightening bolt and the nut is coated therein with the metal glue to realize the tight connection between the iron-core tightening bolt and the nut;

Furthermore, in Step 7): when the front end cover and the rear end cover are installed, two ends of each pole-shoe tightening bolt are opened and provided with a mounting bolt hole; the front end cover and the rear end cover are respectively provided thereon with a fixing bolt hole corresponding to the pole-shoe tightening bolt one by one; the fixing bolt hole is aligned to a mounting bolt hole; and the bolt is inserted into the mounting bolt hole and fastened, thus completing the installation of the front end cover and the rear end cover.

Furthermore, in Step 7): after the front end cover and the rear end cover are installed, the gap between the rotor pole shoe and the rotor spacer is filled with a thermosetting polymer material, such as glass fiber reinforced plastics, epoxy resin, and so on.

The invention has the following conception: the rotor spacer divides a rotor structure into multiple rotor units in the axially direction of the rotor structure; magnetic isolation is carried out for the rotor pole shoe of the adjacent rotor units through the rotor spacer; In the same rotor unit, the rotor pole shoes are independent with each other and may not be in mutual communication, thus avoiding the magnetic flux leakage phenomenon.

The rotor structure is close to the pole-shoe tightening bolt and the iron-core tightening bolt to be tightened tightly. Two ends of the rotor pole shoe closely stand against two rotor spacers, respectively. The centrifugal force, stressing on the rotor pole shoe and the permanent magnet when the rotor structure rotates, is resisted by the friction between the rotor pole shoe and the rotor spacer. Two end surfaces of the rotor iron core closely stand against two the rotor spacers, respectively. The centrifugal force, stressing on the rotor pole shoe and the permanent magnet when the rotor structure rotates, is resisted by the friction between the rotor iron core and the rotor spacer. Meanwhile, the centrifugal force is also resisted by the mutual friction between the laminations of the rotor iron core, between the laminations of the rotor pole shoe and between the laminations of the rotor spacer. The friction between the rotor pole shoe and the rotor spacer is regulated based on the regulation of the tightening force of the pole-shoe tightening bolt. The pole-shoe tightening bolt only needs to bear the axial tensile force and does not need to bear the bending moment generated by the centrifugal force. The pole-shoe tightening bolt is not easy to be broken, and the rotor structure hence has long service life.

The invention has the following effects: 1. The centrifugal force, generated when the rotor structure rotates, is resisted by the friction between the rotor pole shoe and the spacer. The tightening bolt is not easy to be bended and broken. The rotor structure has a long service life. 2. The permanent magnet and the rotor iron core pass through the rotor spacer respectively. That is, the thickness of the rotor spacer does not occupy the axial length of the rotor structure. 3. The rotor pole shoes are independent with each other, thus avoiding magnetic flux leakage phenomenon.

DETAILED DESCRIPTION OF THE INVENTION

Example 1

Referring to FIGS. 1-9:

A method for manufacturing a permanent-magnet motor rotor includes the following steps:

1) manufacturing a rotary shaft 10 (FIG. 1), a permanent magnet 13 (FIG. 1), a front end cover 11 (FIG. 1) and a rear end cover 12 (FIG. 1): manufacturing a magnetic yoke unit, wherein the magnetic yoke unit A (FIG. 3) includes multiple pole shoe parts A1 (see FIG. 3) and one iron core part A2 (see FIG. 3), wherein the pole shoe parts A1 are arranged around the iron core part A2, wherein the pole shoe parts A1 are independent of each other and uniformly distributed, wherein each pole shoe part A1 and the iron core part A2 are connected therebetween via a connecting strip 145, wherein the pole shoe part A1, the connecting strip 145, and the iron core part A2 form a positioning hole A5 for positioning the permanent magnet axially and circumferentially, wherein the pole shoe part A1 is provided with a pole-shoe bolt through hole A11 to allow for penetration by a pole-shoe tightening bolt 23 (FIG. 1), and wherein the iron core part A2 is provided with the iron-core bolt through hole A21 to allow for penetration by the iron-core tightening bolt 24 (FIG. 1); the permanent magnet 13 (FIG. 1) is made of Alnico, ferrite, rare earth or other permanent magnet materials, and used for generating the rotor magnetic field of a permanent-magnet motor; multiple laminations overlap to form the magnetic yoke unit A (see FIG. 1); of course, the magnetic yoke unit A may also be an integral type.

Figure 14:
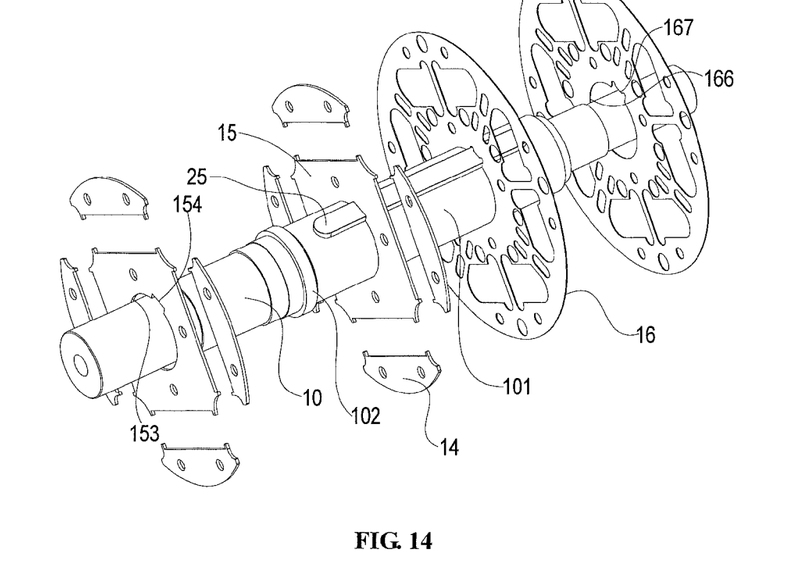
FIG. 14 is a diagram of the mutual fitting among a shaft, a rotor iron core and a rotor spacer of a permanent-magnet motor rotor when the fourth spacer is used.

2) manufacturing a rotor spacer 16 (FIG. 1) with a non-magnetic material, wherein the rotor spacer 16 divides a rotor structure into multiple rotor units in the axially direction, wherein the rotor spacer 16 is provided thereon with a permanent-magnet through hole 165 (FIG. 7) to allow for penetration by the permanent magnet, wherein the rotary spacer 16 is provided thereon with the pole-shoe bolt through hole 161 (FIG. 7) to allow for penetration by the pole-shoe tightening bolt 23 and provided thereon with the iron-core bolt through hole 162 (FIG. 7) to allow for penetration by the iron-core tightening bolt 24; wherein the rotor spacer 16 is made of a non-magnetic material (for example, high strength aluminum alloy, carbon fiber, ceramic, etc.) or a plate material with low magnetic permeability (for example, high-strength austenitic stainless steel, titanium alloy, etc.), and used for bearing the centrifugal force stressed by the rotor pole shoe 14 and the permanent magnet 13 during the high-speed rotation; wherein laminations may overlap to form the rotor spacer 16 which may also be an integral type; wherein the rotor spacer 16 includes the through hole 165 used for the radial and axial positioning of the permanent magnet 13 relative to the rotor shaft 10 (FIG. 1), a circular hole 161 used for accommodating the pole-shoe tightening bolt 23, the circular hole 162 used for accommodating the iron-core tightening bolt 24, and a center circular hole 163 (FIG. 7) used for matching the outer surface of the rotor shaft 10 for the radially positioning the rotor spacer 16 relative to the rotor shaft 10; and wherein the key slot 164 (FIG. 7) matches a key 25 (FIG. 14) on the rotor shaft 10 and used for circumferentially positioning the rotor spacer 16 relative to the rotor shaft 10.

3) sleeving the magnetic yoke unit 16 and the rotor spacer on the rotary shaft 10, wherein the connection between the rotary shaft 10 and the iron core part A2 of the magnetic yoke unit A and the connection between the rotary shaft 10 and the rotor spacer 16 are both key connection, wherein the magnetic yoke unit A and the rotor spacer 16 are distributed axially and at regular intervals, and wherein the rotor spacer 16 divides the rotor structure into multiple rotor units in the axially direction;

all the positioning holes A4 (FIG. 3) of the magnetic yoke unit A correspond to each other to form a positioning passage; the positioning passage corresponds to the permanent-magnet through hole 165 of the rotor spacer 16 to form a permanent-magnet passage; the pole-shoe bolt through hole A11 (FIG. 3) of the magnetic yoke unit A corresponds to the pole-shoe bolt through hole 161 of the rotor spacer 16 one by one to form a pole-shoe bolt passage allowing for penetration by the pole-shoe tightening bolt 23; the iron-core bolt through hole A21 of the magnetic yoke unit A corresponds to the iron-core bolt through hole 162 of the rotor spacer 16 one by one to form an iron-core bolt passage allowing for penetration by the iron-core tightening bolt 24;

4) inserting the permanent magnet 13 into the permanent-magnet passage (shown as 165 in FIG. 7), wherein the permanent magnet 13 is in clearance fit with a permanent-magnet passage;

5) inserting the pole-shoe tightening bolt 23 into each pole-shoe bolt passage, wherein the pole-shoe tightening bolt 23 is in clearance fit with the pole-shoe bolt passage, inserting the iron-core tightening bolt 24 into each iron-core bolt passage, wherein the iron-core tightening bolt 24 is in clearance fit with the iron-core bolt passage, using respectively the two ends of the tightening bolt to connect with the nut to tighten the magnetic yoke unit A and the rotor spacer 16, wherein the connecting strip on the magnetic yoke unit A overlap each other at this time; wherein a lock washer is placed between the nut of an iron-core tightening bolt and the rotor iron core to prevent the nut of the iron-core tightening bolt 24 from becoming loosened; or the thread fitting between the iron-core tightening bolt 24 and the nut is coated therein with a metal glue to realize the tight connection between the iron-core tightening bolt 24 and the nut;

6) cutting off the mid-section of each connecting strip 145 (FIG. 3); overlapping the pole shoe part A1 to form the rotor pole shoe 14 (FIG. 3), overlapping the iron core part A2 to form a rotor iron core 15 (FIG. 3), wherein the rotor pole shoe 14 and the rotor iron core 15 are independent of each other, wherein the upper end surface of the permanent magnet 13 and the lower end surface of the rotor pole shoe 14 are fitted, wherein there is the metal glue between the permanent magnet 13 and the rotor pole shoe 14, wherein the lower surface of the permanent magnet 13 and the rotor iron core 15 are fitted; and wherein there is the metal glue between the permanent magnet 13 and the rotor iron core 15;

7) arranging respectively the front end segment and the rear end segment of the rotor structure on a front end plate 11 and a rear end plate 12, wherein after the front end cover 11 and the rear end cover 12 are installed, the gap between the rotor pole shoe 14 and the rotor spacer 16 is filled with a thermosetting polymer material, such as glass fiber reinforced plastics, epoxy resin, and so on.

The magnetic yoke unit A is made of a ferromagnetic material plate with good magnetic property.

A flat key 25 (FIG. 14) is provided on the rotary shaft 10. The rotor spacer 16 and the rotor iron core 15 are provided thereon with a rotary-shaft through hole allowing for penetration by the rotary shaft 10 and a key slot matched with the flat key 25. The flat key 25 is matched with the key slot to realize the circumferential positioning of the rotary shaft as well as the rotor iron core 15 and the rotor spacer 16. A shaft ring 102 (FIG. 14) is provided on the rotary shaft 10 to realize the circumferential positioning of the rotor iron core 15 and the rotor spacer 16 which are relative to the rotary shaft.

The permanent magnet 13 between the rotor pole shoe 14 and the rotor iron core 15s a single-block magnet. Alternatively, multiple permanent magnets 13 between the rotor pole shoe 14 and the rotor iron core 15 are jointed along the rotor axially to form a permanent magnet group (FIGS. 9-12). The permanent-magnet through hole 165 (FIG. 7) on the rotor spacer 16 corresponds to the permanent magnet 13 one by one. A placing strip is provided between the adjacent permanent-magnet through holes 165.

Figure 8:
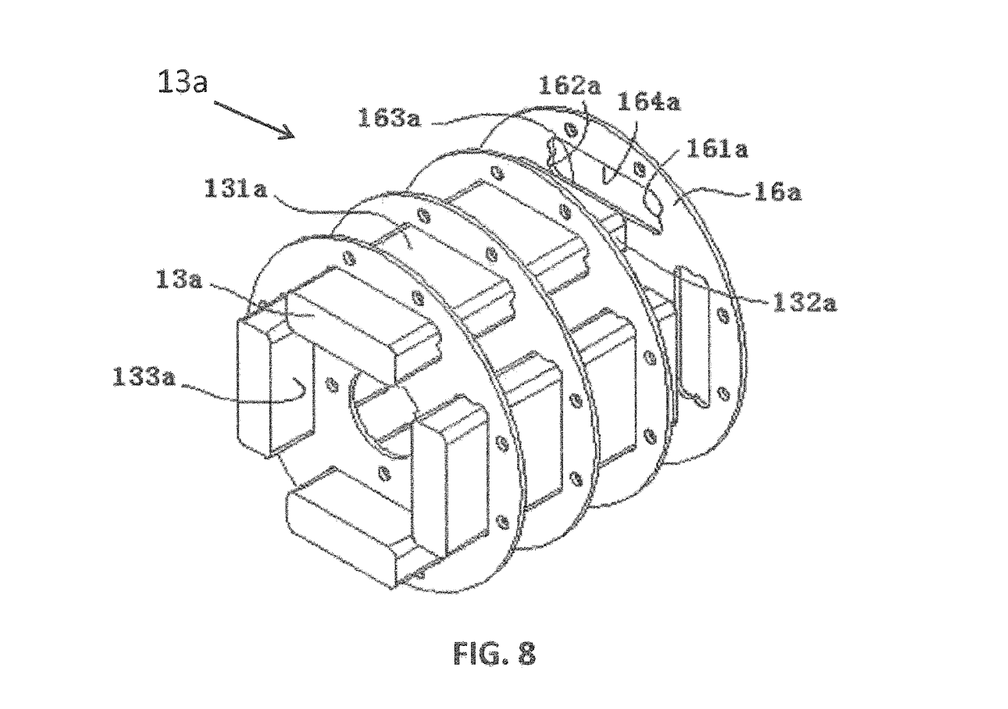
FIG. 8 is an assembly diagram of the first permanent-magnet motor rotor spacer and a permanent magnet.

When the permanent magnet 13 is a single-block magnet, the first rotor spacer 16a is adopted. The structure of the first rotor spacer 16a is showed in FIG. 7. The rotor spacer 16a, used for accommodating the through hole 165 of the permanent magnet 13, is an irregularly shaped hole. The permanent magnet between the rotor pole shoe and the rotor iron core is a single-block magnet. The inner sides 163a and 164a of the permanent-magnet through hole 161 of the rotor spacer 16a are respectively and mutually close to and lean against the surfaces 133a and 131a of the permanent magnet 13a (FIG. 8), thus realizing the radial positioning of the permanent magnet 13a relative to the rotor shaft 10. The inner sides 161a and 162a of the rotor spacer 16a are respectively and mutually close to and lean against two sides 132a of the permanent magnet 13a, thus realizing the circumferential positioning of the permanent magnet 13a relative to the rotor shaft 10, as shown in FIG. 8.

Figure 9:
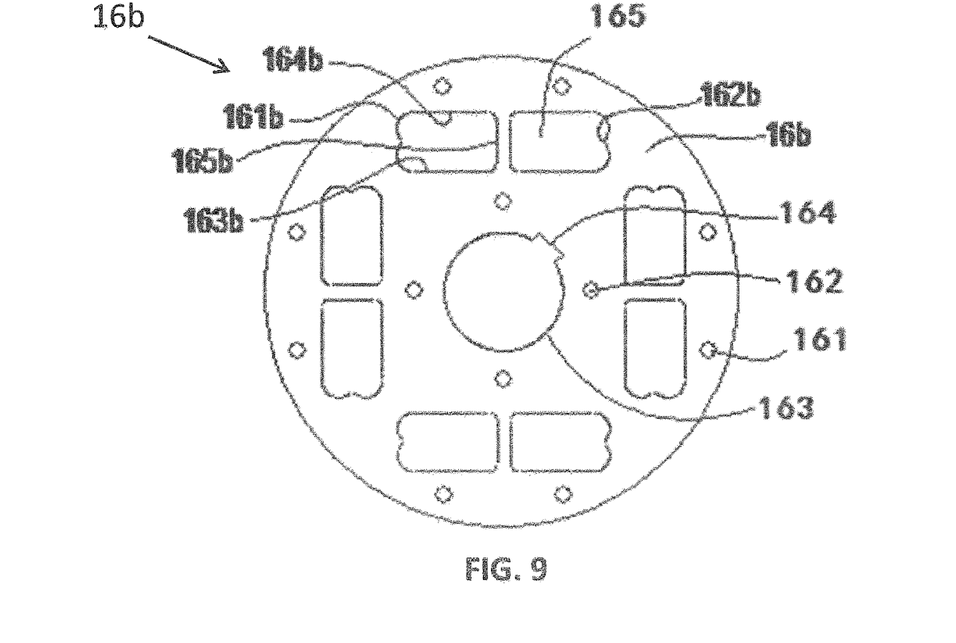
FIG. 9 is a diagram of the second permanent-magnet motor rotor spacer.

When the permanent magnet 13 is a permanent-magnet group, the second rotor spacer 16ba is adopted. The structure of the second rotor spacer is shown in FIG. 9. Two permanent magnets between the rotor pole shoe and the rotor iron core are jointed axially along the rotor. The inner sides 163b and 164b of the rotor spacer 16b are used for realizing the radial positioning of the permanent magnet 13 relative to the rotor shaft 10. The inner sides 162b and 165b are used for realizing the circumferential positioning of the permanent magnet 13 relative to the rotor shaft 10. The key slot 164 and an inner circular hole 163 are used for realizing the circumferential and radial positioning of the rotor spacer 16b relative to the rotor shaft 10. One side of the through hole used for accommodating the permanent magnet 13 adopts two circular arcs 161b, and the other side thereof adopts a straight side 165b.

Figure 1:
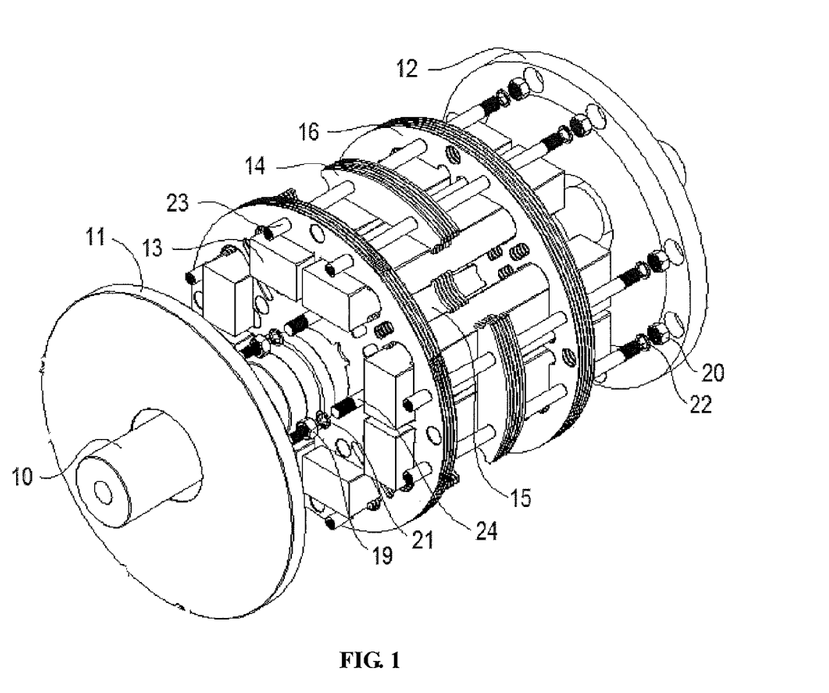
FIG. 1 is an exploded diagram of parts of a rotor of a permanent-magnet motor rotor.
Figure 2:
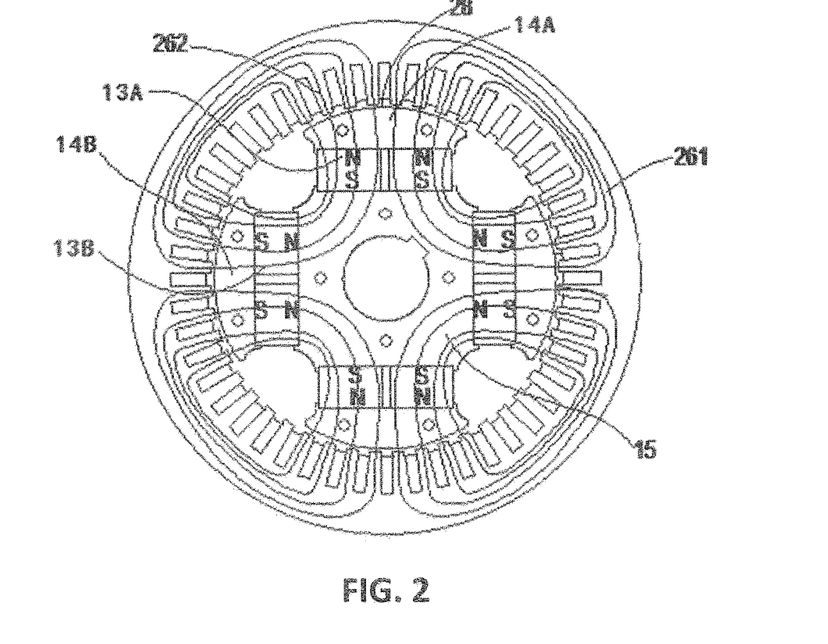
FIG. 2 is an analysis diagram of a permanent-magnet motor rotor and a stator magnetic field.
Figure 3:
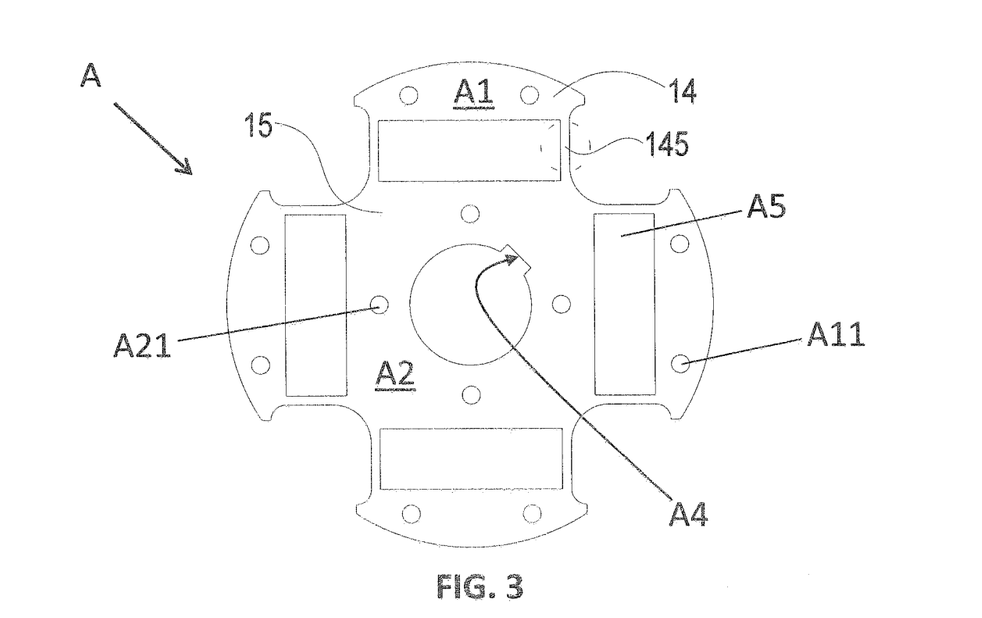
FIG. 3 is a diagram of a pole shoe part and an iron core part which are connected through a connecting strip.
Figure 4:
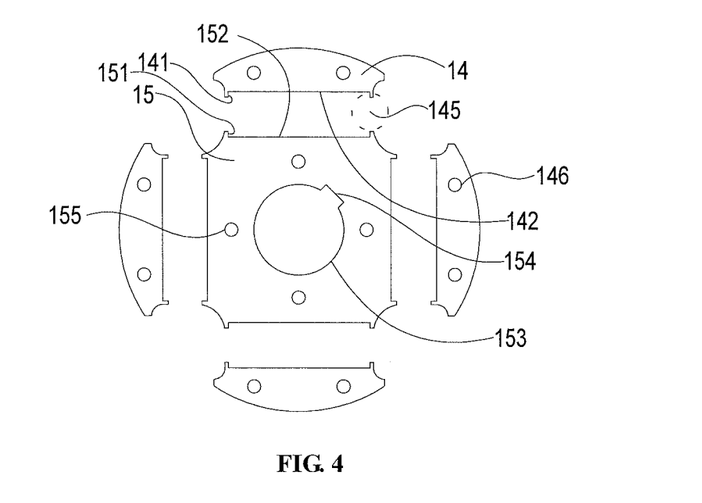
FIG. 4 is a diagram a pole shoe part and an iron core part which are separated and form a rotor pole shoe and a rotor iron core.
Figure 5:
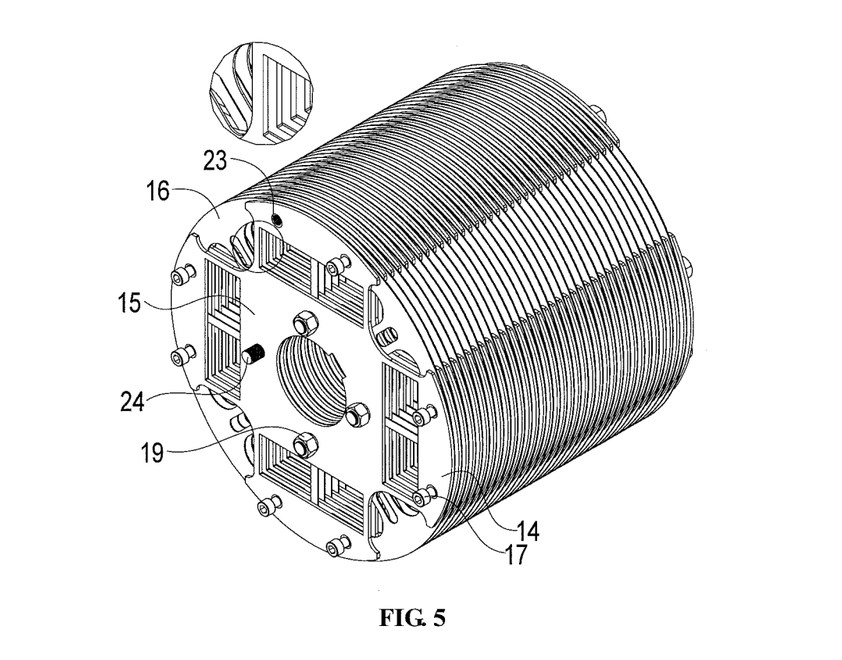
FIG. 5 is a diagram of the assembly of a rotor pole shoe and a rotor iron core as well as a rotor spacer when a connecting strip is between a pole shoe part and an iron core part.
Figure 6:
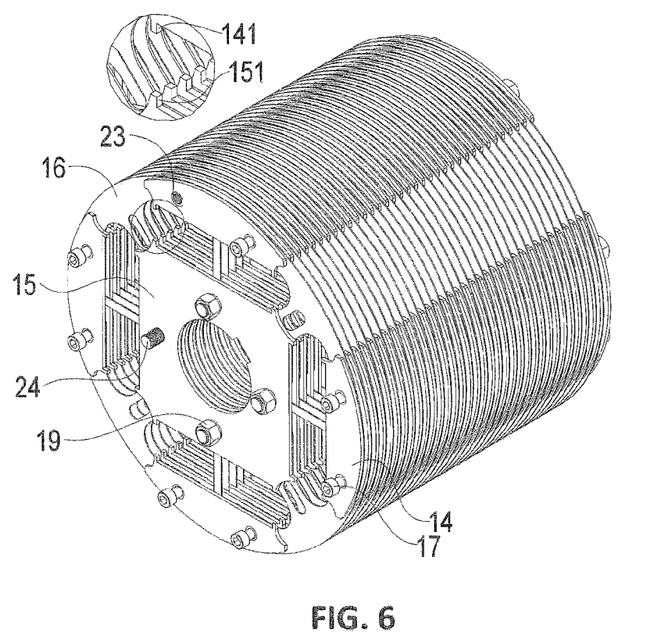
FIG. 6 is a diagram of the assembly of a rotor pole shoe and a rotor iron core as well as a rotor spacer when a pole shoe part and an iron core part are under separate state.
Figure 7:
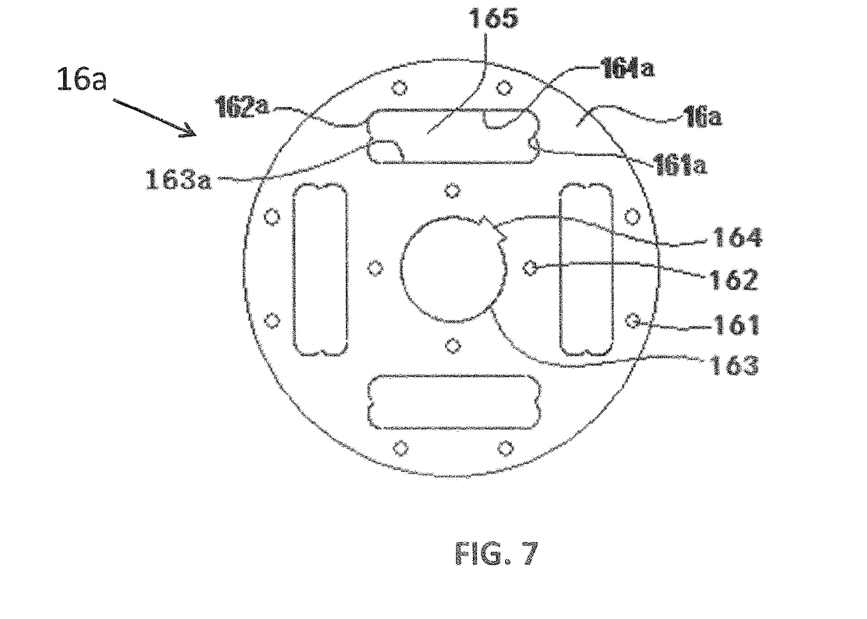
FIG. 7 is a diagram of the first permanent-magnet motor rotor spacer.

The analysis of the 2D magnetic path of the permanent-magnet motor rotor is shown as FIG. 2. The magnetic flow (magnetic line) of the magnetic field of the motor circulates based on the following paths: The magnetic line starts from current permanent magnet 13A, passes through the rotor pole shoe 14A, enters into a gas gap 28, passes through a stator tooth part 262, enters into a stator, reaches the area corresponding to adjacent poles in the stator along a yoke part 261 of the stator, enters into the gas gap through a tooth part of a stator, enters into the S pole of the adjacent permanent magnet through the adjacent rotor pole shoe 14B, enters into the rotor iron core 15 from the N pole, finally goes back to the N pole of the current permanent magnet 13A, and forms a circuit of the magnetic line.

The invention has the following conception: The rotor spacer 16 divides a rotor structure into multiple rotor units in the axially direction of the rotor structure. Magnetic isolation is carried out for the rotor pole shoe 14 of the adjacent rotor units through the rotor spacer 16. In the same rotor unit, the rotor pole shoes 14 are independent of each other and may not be in mutual communication, thus avoiding the magnetic flux leakage phenomenon.

The rotor structure is close to the pole-shoe tightening bolt 23 and the iron-core tightening bolt 24 to be tightened tightly. Two ends of the rotor pole shoe 14 closely stand against two rotor spacers 16, respectively. The centrifugal force, stressing on the rotor pole shoe 14 and the permanent magnet 13 when the rotor structure rotates, is countered by the friction between the rotor pole shoe 14 and the rotor spacer 16. Two end surfaces of the rotor iron core 15 closely stand against two the rotor spacers 16, respectively. The centrifugal force, stressing on the rotor pole shoe and the permanent magnet when the rotor structure rotates, is countered by the friction between the rotor iron core 15 and the rotor spacer 16. Meanwhile, the centrifugal force is also countered by the mutual friction between the laminations of the rotor iron core 15, between the laminations of the rotor pole shoe 14 and between the laminations of the rotor spacer 16. The friction between the rotor pole shoe 14 and the rotor spacer 16 is regulated by controlling the tightening force of the pole-shoe tightening bolt 23. The pole-shoe tightening bolt only needs to bear the axial tensile force and does not need to bear the bending moment generated by the centrifugal force. The pole-shoe tightening bolt is not easy to be broken, and the rotor structure hence has a long service life.

The invention has the following effects: 1. The centrifugal force, generated when the rotor structure rotates, is countered by the friction between the rotor pole shoe and the spacer. The pole-shoe tightening bolt is not easy to be bended and broken, and the rotor structure hence has a long service life. 2. The permanent magnet and the rotor iron core pass through the rotor spacer, respectively. That is, the thickness of the rotor spacer does not occupy the axial length of the rotor structure. 3. The rotor pole shoes are independent of each other, thus avoiding magnetic flux leakage phenomenon.

Example 2

Referring to FIGS. 10-14:

Compared with Example 1, this example has the following difference: when the rotor spacer 16 is manufactured in Step 2), with finite element analysis, the rotor spacer is opened and provided thereon with a lightening hole 166 (FIG. 10) to reduce the weight of the rotor spacer and lowering the stress concentration. Multiple lightening holes 166 may be uniformly distributed around each permanent-magnet through hole 165. Multiple lightening holes 166 around the same permanent magnet 13 form one lightening-hole group. The lightening-hole groups are symmetrically distributed therebetween. The lightening hole 166 is a hole circled by a smooth curve.

Figure 10:
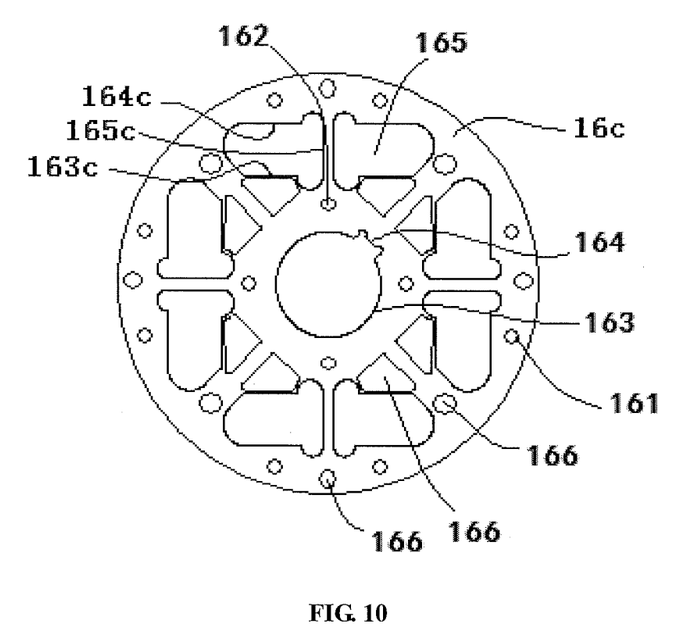
FIG. 10 is a diagram of the third permanent-magnet motor rotor spacer.

The lightening hole 166 may be a circular hole, a kidney-shaped hole, or a polygonal hole with arc transition at its corner. The lightening hole is mainly concentrated at the corner of the permanent-body through hole. The rest manufacturing steps are all the same.

two rotor spacers, provided with the lightening hole, are illustrated and described in the following:

The structure of a third rotor spacer 16c is showed in FIG. 10. The inner sides 163c and 164c of the permanent-magnet through hole of the rotor spacer 16c is used for realizing the radial positioning of the permanent magnet 13 relative to the rotor shaft 10. The inner sides 165c are used for the circumferential positioning of the permanent magnet 13 relative to the rotor shaft 10. The key slot 164 and an inner circular hole 163 are used for realizing the circumferential and radial positioning of the rotor spacer 16c relative to the rotor shaft 10. The lightening hole of this rotor spacer 16c is a circular hole or a polygonal hole with arc transition at its corner. The lightening 166 is distributed at one side of the permanent-magnet through hole, which is close to the rotor iron core 15.

Figure 11:
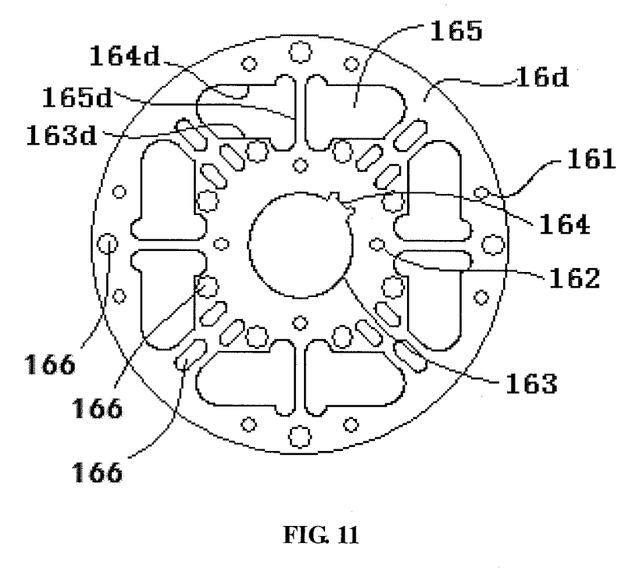
FIG. 11 is a diagram of the fourth permanent-magnet motor rotor spacer.
Figure 12:
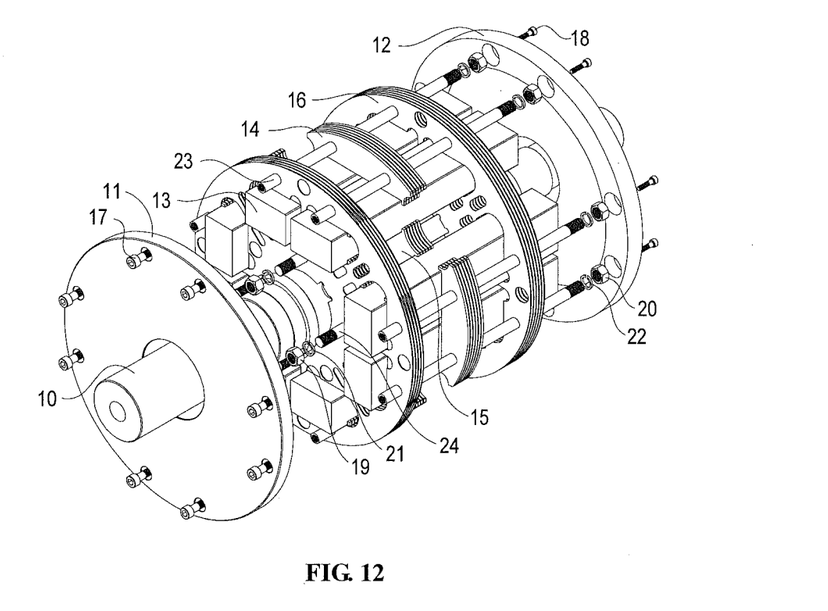
FIG. 12 is an exploded diagram of parts of a permanent-magnet motor rotor when the fourth spacer is used.
Figure 13:
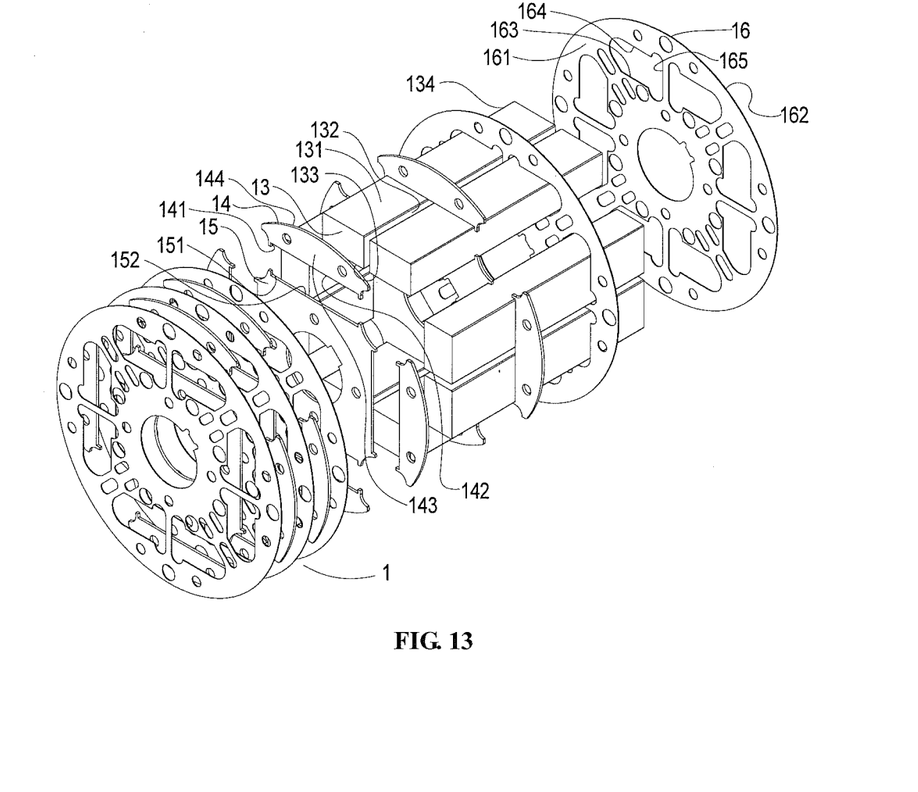
FIG. 13 is an exploded diagram of a permanent magnet, a rotor pole shoe and a rotor spacer of a permanent-magnet motor rotor when the fourth spacer is used.

The structure of a fourth rotor spacer 16d is showed in FIG. 11. The inner sides 163d and 164d of the permanent-magnet through hole of the rotor spacer 16d is used for realizing the radial positioning of the permanent magnet 13 relative to the rotor shaft 10. The inner sides 165d are used for the circumferential positioning of the permanent magnet 13 relative to the rotor shaft 10. The inner circular arcs 166d, 167d and 168d are all transition circular arcs provided to lower the stress concentration. The key slot 164 and an inner circular hole 163 are used for realizing the circumferential and radial positioning of the rotor spacer 16d relative to the rotor shaft 10. The lightening hole of this rotor spacer 16d is a circular hole or a polygonal hole with arc transition at its corner. The lightening 166 is distributed at one side of the permanent-magnet through hole, which is close to the rotor iron core 15.

With the lightening hole provided on the rotor spacer, not only the weight of the rotor structure is reduced, but also the stress concentration caused by the extrusion of the permanent magnet during rotation may be reduced.

Example 3

Figure 15:
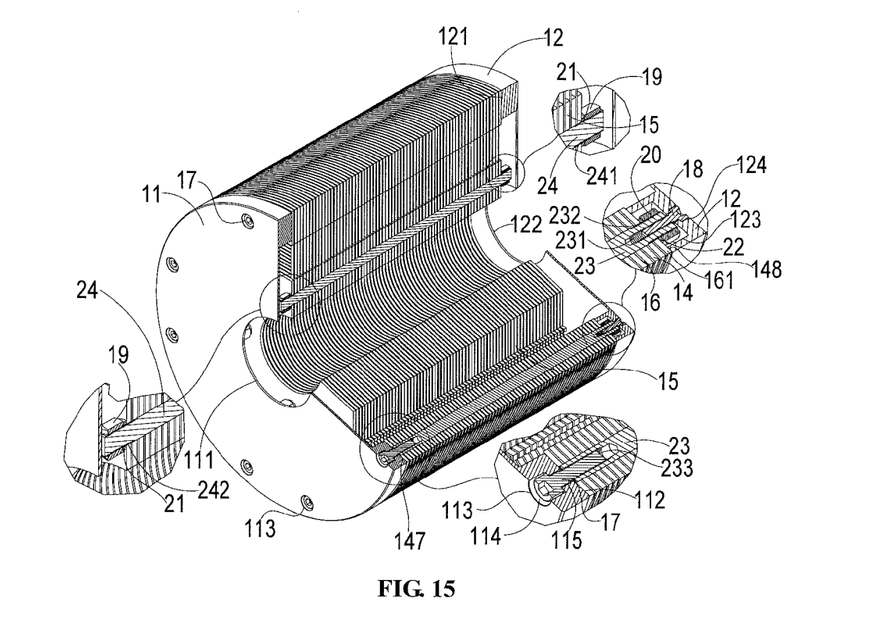
FIG. 15 is an assembly diagram of a permanent-magnet motor rotor.
Figure 16:
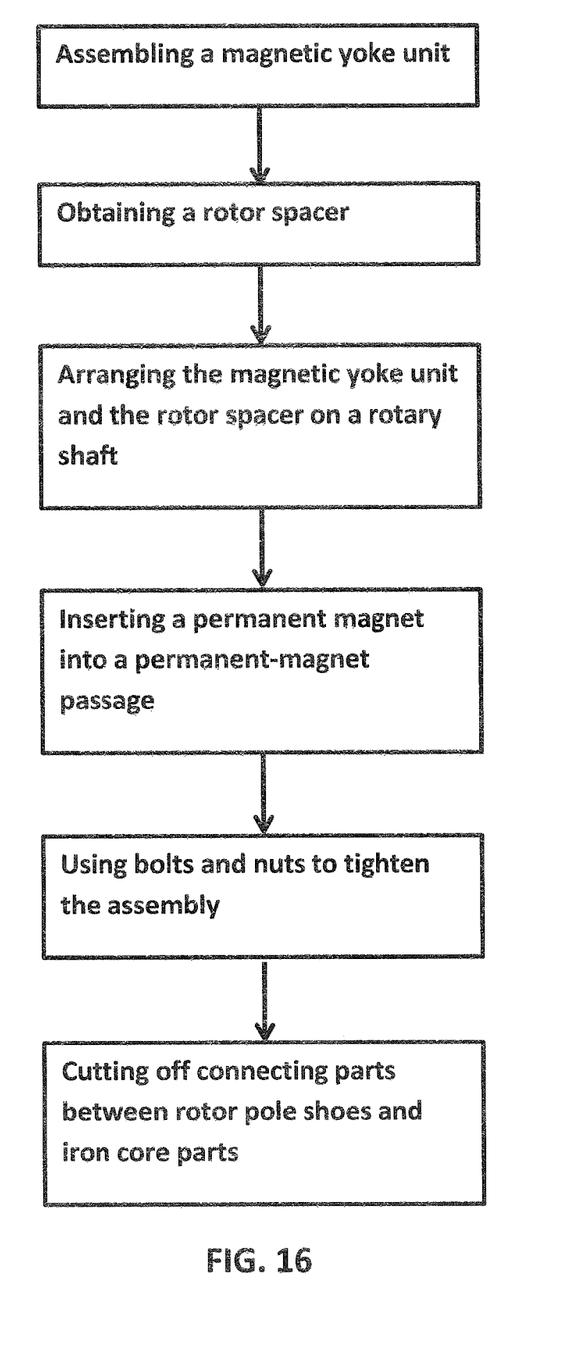
FIG. 16 shows a flowchart illustrating a method in accordance with one embodiment of the invention.

Referring FIG. 15

Compared with Example 2, this example has the following difference: in Step 7): when the front end cover 11 and the rear end cover 12 are installed, two ends of each pole-shoe tightening bolt are opened and provided with a mounting bolt hole. The front end cover 11 and the rear end cover 12 are, respectively, provided thereon with a fixing bolt hole corresponding to the pole-shoe tightening bolt 23 one by one. The fixing bolt hole is aligned to the mounting bolt hole. The bolt is inserted into the mounting bolt hole and fastened, thus completing the installation of the front end cover 11 and the rear end cover 12. The rest manufacturing steps are all the same.

The front end plate 11 and the rear end plate 12 of the rotor are made of a thicker non-magnetic plate material or a thicker plate material with low magnetic permeability (for example, high-strength austenitic stainless steel, etc.). This not only may stabilize the rotor pole shoe 14, the rotor spacer 16 and the permanent magnet 13, but also may be taken as a de-weighting structure when the permanent motor rotor is carried out with balance modification. The tightening bolt 17 (FIG. 15) of the front end plate, through an external thread, is jointed with an inner thread hole 233 at the front end of the pole-shoe tightening bolt 23, thus facilitating the front end plate 11 and the pole-shoe tightening bolt 23 to be jointed with each other, and facilitating the inner side 112 of the front end plate 11 of the rotor to closely stand against the front side 147 of the rotor pole shoe 14 at the front end of the rotor. The outer surface of the back end of the pole-shoe tightening bolt 23 has the external thread 232. The external thread 232 is jointed with the nut of the pole-shoe tightening bolt to realize the fastening of the rotor pole shoe 14 and the rotor spacer 16. The lock washer is placed between the nut 20 of the pole-shoe tightening bolt and the rear side 148 of the rotor pole shoe at the back end of the rotor to prevent the nut of the pole-shoe tightening bolt from becoming loosed. Alternatively, the thread fitting between the external thread 232 of the pole-shoe tightening bolt 23 and the nut 20 of the pole-shoe tightening bolt is coated therein with the metal glue to realize the tight connection therebetween. The tightening bolt 18 of the back end plate, through the external thread, is jointed with an inner thread hole 231 at the back end of the pole-shoe tightening bolt 23, thus facilitating the back end plate 12 and the pole-shoe tightening bolt 23 to be jointed with each other, and facilitating the inner side 121 of the back end plate 12 of the rotor to closely stand against the back side 148 of the rotor pole shoe 14 at the back end of the rotor. A small gap is preserved between the inner hole 111 of the front end plate of the rotor and the shaft ring 102 of the rotor shaft 10, thus preventing the front end plate 11 and the rotor shaft 10 from being interfered during the assembly of the rotor.

The contents of the examples of the invention are only used for illustrating the embodiments of the invention. The protection scope of the invention shall not be limited to the detailed forms of the examples. The protection scope of the invention shall include equal technical means known by those persons skilled in the art according to the invention.

What is claimed is:

1. A method for manufacturing a permanent-magnet motor rotor, comprising:
   (a) providing a magnetic yoke unit, wherein the magnetic yoke unit comprises multiple pole shoe parts and an iron core part, wherein the pole shoe parts are arranged around the iron core part, wherein the pole shoe parts are independent of each other and uniformly distributed, wherein each of the pole shoe parts and the iron core part are connected via a connecting strip, wherein the pole shoe parts, the connecting strip, and the iron core part form a positioning hole for housing a permanent magnet axially, wherein the pole shoe parts are provided with a pole-shoe bolt through hole for insertion of a pole-shoe tightening bolt, and wherein the iron core part is provided with an iron-core bolt through hole for insertion of an iron-core tightening bolt;
   (b) forming a rotor spacer made of a non-magnetic material, wherein the rotor spacer is provided thereon with a permanent-magnet through hole for insertion of the permanent magnet, and wherein the rotor spacer is provided thereon with a pole-shoe bolt through hole for insertion of the pole-shoe tightening bolt and an iron-core bolt through hole for insertion of the iron-core tightening bolt;
   (c) arranging one or more of the magnetic yoke unit and the rotor spacer on a rotary shaft, wherein the magnetic yoke unit and the rotor spacer are distributed axially at regular intervals on the rotary shaft, and wherein the rotor spacer divides the rotor structure into multiple rotor units in an axial direction, wherein all positioning holes of the magnetic yoke unit correspond to each other to form a positioning passage, wherein the positioning passage corresponds to the permanent-magnet through hole of the rotor spacer to form a permanent-magnet passage, wherein the pole-shoe bolt through hole of the magnetic yoke unit corresponds to the pole-shoe bolt through hole of the rotor spacer to form a pole-shoe bolt passage for insertion of the pole-shoe tightening bolt, wherein the iron-core bolt through hole of the magnetic yoke unit corresponds to the iron-core bolt through hole of the rotor spacer to form an iron-core bolt passage for insertion of the iron-core tightening bolt;
   (d) inserting the permanent magnet into the permanent-magnet passage, wherein the permanent magnet is in clearance fit with the permanent-magnet passage;
   (e) inserting the pole-shoe tightening bolt into each pole-shoe bolt passage, wherein the pole-shoe tightening bolt is in clearance fit with the pole-shoe bolt passage; inserting the iron-core tightening bolt into the iron-core bolt passage, wherein the iron-core tightening bolt is in clearance fit with the iron-core bolt passage; placing nuts on ends of the pole-shoe tightening bolt and the iron-core tightening bolt to connect the magnetic yoke unit and the rotor spacer;
   (f) cutting off a mid-section of the connecting strip; and installing a front end plate and a rear end plate, respectively, to enclose a front end and a rear end of the rotor structure to form the permanent-magnet motor rotor.

2. The method for manufacturing the permanent-magnet motor rotor of claim 1, wherein the magnetic yoke unit is made of multiple plates.

3. The method for manufacturing the permanent-magnet motor rotor of claim 2, wherein the magnetic yoke unit is made of a ferromagnetic material plate.

4. The method for manufacturing the permanent-magnet motor rotor of claim 3, further comprising applying a metal glue to a upper surface of the permanent magnet to fix the permanent magnet to a lower surface of the rotor pole shoe; applying a metal glue to a lower surface of the permanent magnet to fix the permanent magnet to the rotor iron core.

5. The method for manufacturing the permanent-magnet motor rotor of claim 4, wherein the front end cover and the rear end cover are respectively provided thereon with a fixing bolt hole to accommodate the pole-shoe tightening bolt; wherein the installing the front end cover and the rear end cover comprises inserting the poly-shoe tightening bolt through the fixing bolt hole.

6. The method for manufacturing the permanent-magnet motor rotor of claim 2, further comprising applying a metal glue to a upper surface of the permanent magnet to fix the permanent magnet to a lower surface of the rotor pole shoe; applying a metal glue to a lower surface of the permanent magnet to fix the permanent magnet to the rotor iron core.

7. The method for manufacturing the permanent-magnet motor rotor of claim 6, wherein the front end cover and the rear end cover are respectively provided thereon with a fixing bolt hole to accommodate the pole-shoe tightening bolt; wherein the installing the front end cover and the rear end cover comprises inserting the poly-shoe tightening bolt through the fixing bolt hole.

8. The method for manufacturing the permanent-magnet motor rotor of claim 1, wherein a flat key is provided on the rotary shaft; the rotor spacer and the rotor iron core are provided thereon with a rotary shaft through hole with a key slot, which matches the flat key on the rotary shaft, for insertion of the rotary shaft; wherein the flat key is matched with the key slot to realize circumferential positioning of the rotor iron core and the rotor spacer relative to the rotary shaft.

9. The method for manufacturing the permanent-magnet motor rotor of claim 8, further comprising applying a metal glue to a upper surface of the permanent magnet to fix the permanent magnet to a lower surface of the rotor pole shoe; applying a metal glue to a lower surface of the permanent magnet to fix the permanent magnet to the rotor iron core.

10. The method for manufacturing the permanent-magnet motor rotor of claim 9, wherein the front end cover and the rear end cover are respectively provided thereon with a fixing bolt hole to accommodate the pole-shoe tightening bolt; wherein the installing the front end cover and the rear end cover comprises inserting the poly-shoe tightening bolt through the fixing bolt hole.

11. The method for manufacturing the permanent-magnet motor rotor of claim 1, wherein the permanent magnet is a single-block magnet.

12. The method for manufacturing the permanent-magnet motor rotor of claim 11, further comprising applying a metal glue to a upper surface of the permanent magnet to fix the permanent magnet to a lower surface of the rotor pole shoe; applying a metal glue to a lower surface of the permanent magnet to fix the permanent magnet to the rotor iron core.

13. The method for manufacturing the permanent-magnet motor rotor of claim 1, wherein the permanent magnet comprises multiple pieces arranged axially.

14. The method for manufacturing the permanent-magnet motor rotor of claim 13, further comprising applying a metal glue to a upper surface of the permanent magnet to fix the permanent magnet to a lower surface of the rotor pole shoe; applying a metal glue to a lower surface of the permanent magnet to fix the permanent magnet to the rotor iron core.

15. The method for manufacturing the permanent-magnet motor rotor of claim 1, wherein the permanent-magnet through hole on the rotor spacer comprises rounded corners, thereby lowering stress exerted on the rotor spacer by the permanent magnet during rotation.

16. The method for manufacturing the permanent-magnet motor rotor of claim 15, wherein the rotor spacer comprising one or more holes to reduce a weight of the rotor spacer.

17. The method for manufacturing the permanent-magnet motor rotor of claim 16, further comprising applying a metal glue to a upper surface of the permanent magnet to fix the permanent magnet to a lower surface of the rotor pole shoe; applying a metal glue to a lower surface of the permanent magnet to fix the permanent magnet to the rotor iron core.

18. The method for manufacturing the permanent-magnet motor rotor of claim 15, further comprising applying a metal glue to a upper surface of the permanent magnet to fix the permanent magnet to a lower surface of the rotor pole shoe; applying a metal glue to a lower surface of the permanent magnet to fix the permanent magnet to the rotor iron core.

19. The method for manufacturing the permanent-magnet motor rotor of claim 1, further comprising: applying a metal glue to an upper surface of the permanent magnet to fix the permanent magnet to a lower surface of the rotor pole shoe; applying a metal glue to a lower surface of the permanent magnet to fix the permanent magnet to the rotor iron core.

20. The method for manufacturing the permanent-magnet motor rotor of claim 19, wherein the front end cover and the rear end cover are respectively provided thereon with a fixing bolt hole to accommodate the pole-shoe tightening bolt; wherein the installing the front end cover and the rear end cover comprises inserting the poly-shoe tightening bolt through the fixing bolt hole.

* * * * *